(12) United States Patent
Tempel

(10) Patent No.: US 11,261,992 B2
(45) Date of Patent: Mar. 1, 2022

(54) PLUMBING VALVE AND CORRESPONDING SERIES

(71) Applicant: Neoperl GmbH, Mullheim (DE)

(72) Inventor: Marc Tempel, Freiburg (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 16/480,462

(22) PCT Filed: Jan. 16, 2018

(86) PCT No.: PCT/EP2018/050980
§ 371 (c)(1),
(2) Date: Jul. 24, 2019

(87) PCT Pub. No.: WO2018/162125
PCT Pub. Date: Sep. 13, 2018

(65) Prior Publication Data
US 2019/0383402 A1    Dec. 19, 2019

(30) Foreign Application Priority Data

Mar. 10, 2017   (DE) .................. 202017101403.7

(51) Int. Cl.
| | |
|---|---|
| *F16K 31/385* | (2006.01) |
| *F16K 27/02* | (2006.01) |
| *F16K 31/145* | (2006.01) |
| *G05D 7/03* | (2006.01) |
| *F16K 31/524* | (2006.01) |
| *E03C 1/02* | (2006.01) |
| *F16K 1/52* | (2006.01) |

(52) U.S. Cl.
CPC ...... *F16K 31/3855* (2013.01); *F16K 27/0236* (2013.01); *F16K 31/145* (2013.01); *F16K 31/52408* (2013.01); *G05D 7/03* (2013.01); *E03C 1/02* (2013.01); *E03C 2001/026* (2013.01); *F16K 1/523* (2013.01)

(58) Field of Classification Search
CPC ................ F16K 1/523; F16K 31/3855; F16K 31/52408; F16K 27/0236; F16K 31/145; G05D 7/03; E03C 1/02; E03C 2001/026
See application file for complete search history.

(56) References Cited

U.S. PATENT DOCUMENTS

| | | | | |
|---|---|---|---|---|
| 3,216,451 | A | * 11/1965 | Smallpeice | ............ G05D 7/012 137/861 |
| 3,847,178 | A | * 11/1974 | Keppel | .................... F16K 1/465 137/515.7 |
| 4,500,067 | A | 2/1985 | Zukausky | |

(Continued)

FOREIGN PATENT DOCUMENTS

| | | |
|---|---|---|
| CN | 105164597 | 12/2015 |
| CN | 106051208 | 10/2016 |

(Continued)

*Primary Examiner* — Umashankar Venkatesan
(74) *Attorney, Agent, or Firm* — Volpe Koenig

(57) ABSTRACT

A sanitary valve (1) having a movable diaphragm (4) of a main valve (3) that is actuable using a push-push mechanism (8) which defines at least three discrete switching positions of the main valve (3) controlled via a pilot valve (6), and/or a flowrate regulator (34), preferably adjustable by the push-push mechanism (8), arranged permanently downstream from the main valve (3).

18 Claims, 12 Drawing Sheets

(56) References Cited

U.S. PATENT DOCUMENTS

| | | | |
|---|---|---|---|
| 5,573,224 A | 11/1996 | Kim | |
| 5,599,003 A | 2/1997 | Seemann et al. | |
| 6,837,267 B2 | 1/2005 | Weis et al. | |
| 9,677,680 B2 * | 6/2017 | Tempel | E03C 1/044 |
| 10,337,641 B2 * | 7/2019 | Ye | F16K 47/023 |
| 2016/0010759 A1 | 1/2016 | Tempel | |
| 2018/0031141 A1 | 2/2018 | Ye et al. | |

FOREIGN PATENT DOCUMENTS

| | | | |
|---|---|---|---|
| CN | 207229885 | 4/2018 | |
| DE | 102012221043 | 5/2014 | |
| DE | 202013002281 | 7/2014 | |
| EP | 2865928 A1 * | 4/2015 | F16K 31/086 |
| JP | S59147177 | 8/1984 | |
| JP | H07323187 | 12/1995 | |
| JP | 2007046770 | 2/2007 | |
| JP | 2008291984 | 12/2008 | |
| WO | WO-2014076182 A1 * | 5/2014 | F16K 31/3855 |
| WO | WO-2014076242 A1 * | 5/2014 | F16K 31/3855 |

\* cited by examiner

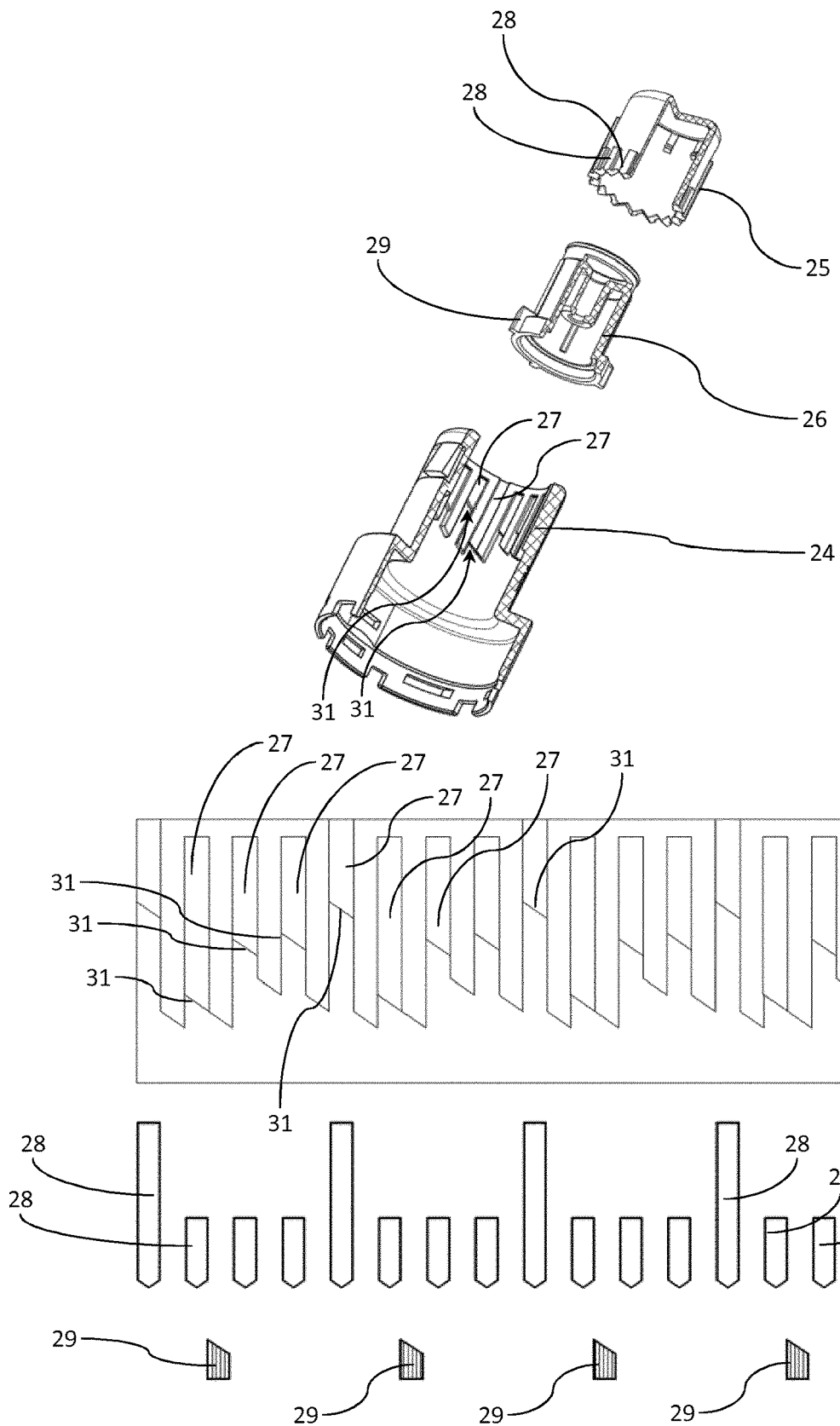

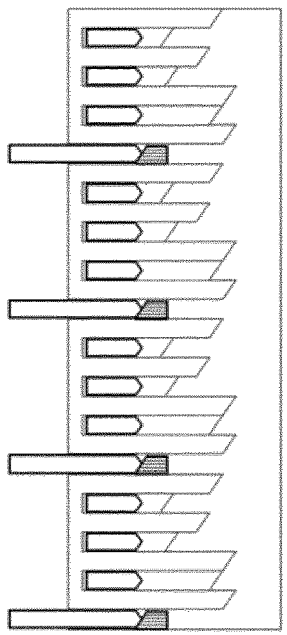
Fig. 10
Fig. 11
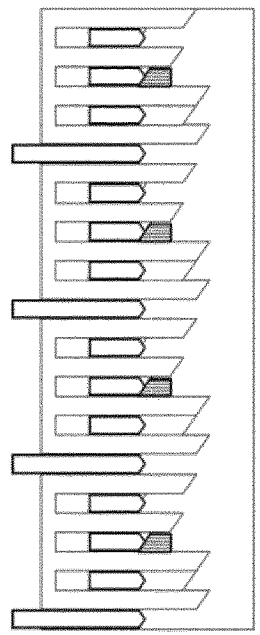
Fig. 12
Fig. 13
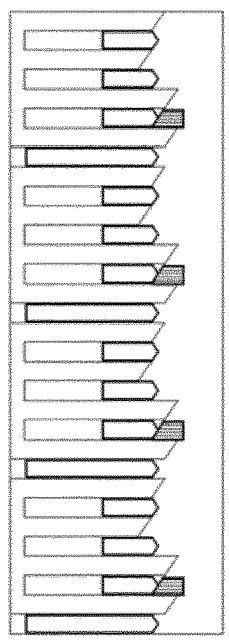
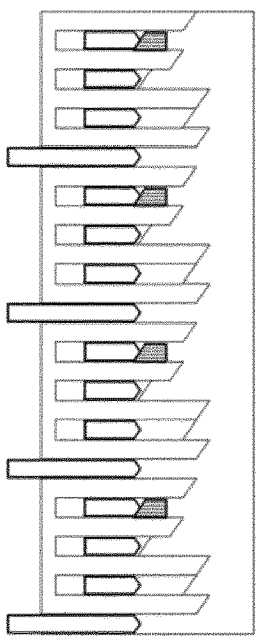
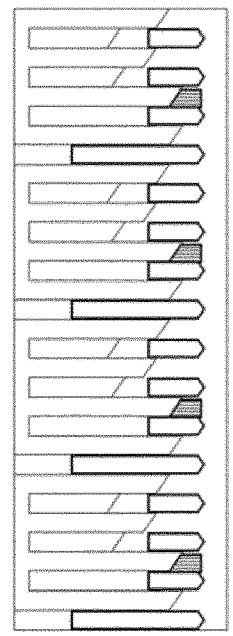
Fig. 14

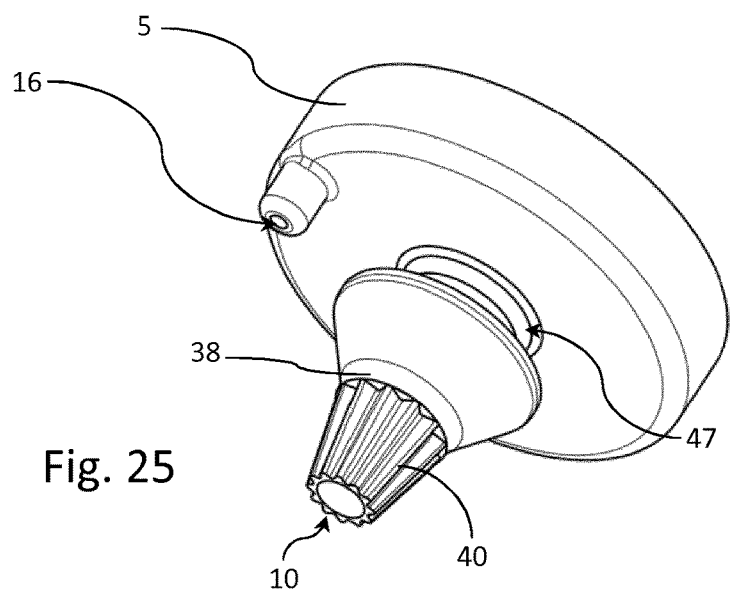
Fig. 25
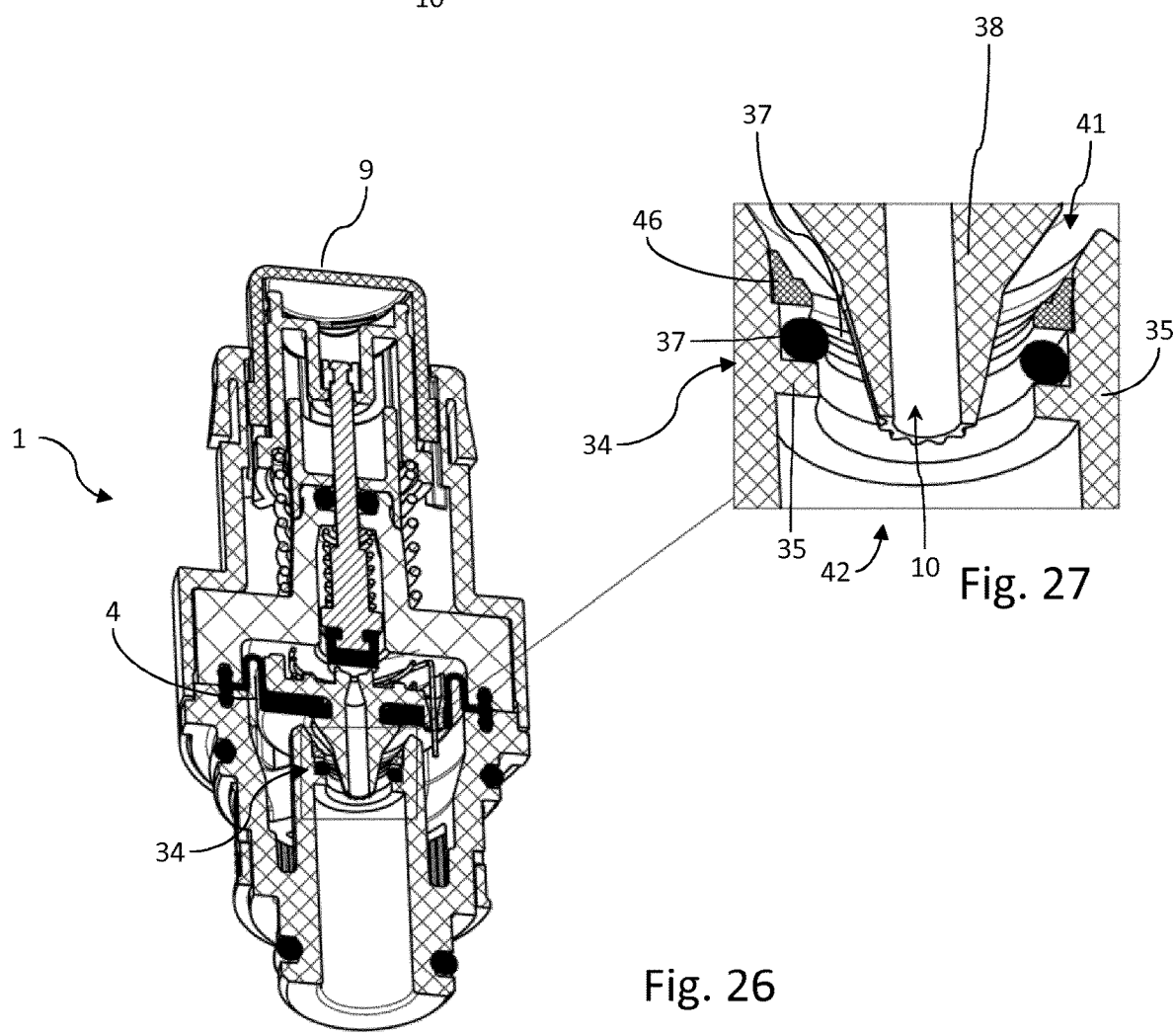
Fig. 26
Fig. 27

ND CORRESPONDING
PLUMBING VALVE AND CORRESPONDING SERIES

BACKGROUND

The invention relates to a sanitary valve, having a main valve which has a movable diaphragm, and a pilot valve with which the main valve is actuatable, wherein a position of the diaphragm is predefinable by a position of a valve tappet of the pilot valve.

Sanitary valves of this kind are known and are used, for example, to permit switching on or switching over in a water conduit using the least possible actuation force and/or with the smoothest possible switching behavior.

SUMMARY

The object of the invention is to make available a sanitary valve with improved use properties.

This object is achieved by a sanitary valve with one or more of the features of the invention. In particular, in a sanitary valve of the type described in the introduction, the object is thus achieved according to the invention by the fact that the valve tappet is connected to a push-push mechanism by which the valve tappet is switchable between at least three switching positions. Thus, in addition to the known open and closed positions, the invention additionally permits further switching positions, for example intermediate positions between "fully open" and "fully closed". These intermediate positions can be easily achieved, with the invention, by the actuation of the push-push mechanism. The use properties are thus improved in relation to the previously known sanitary valves. For example, it is thus easy to obtain switching states that save water by comparison with the fully open switching position.

Between the open position and the closure position, a large number of intermediate stages can thus be achieved, which permit finely adjusted selection of a water-saving mode. This can be achieved, for example, if each of the switching positions defines a throttle action, such that there is a graded arrangement of different throttle opening cross sections.

A push-push mechanism can be characterized, for example, in that a mechanical guide enforces a preferably cyclical alternation between the achievable switching states by repeated, uniform actuation (for example by pressing) of an actuation element.

In an advantageous embodiment, provision can be made that the push-push mechanism defines two outer switching positions and at least two inner switching positions, wherein the at least two inner switching positions lie between the two outer switching positions. It is thus possible to achieve a finer gradation of intermediate settings. Provision can be made here that a spacing between the two inner switching positions is smaller than a spacing of one of the inner switching positions from a respectively neighboring or closest outer switching position. In this way, idle travel that has to be covered when leaving the closure position and/or the open position can be easily taken into account. Such idle travel can arise, for example, when the attainment of the closure position has to be guaranteed within a wide tolerance of manufacture of the sanitary valve. It is thus possible to define the adjustment path beyond this closure position in order to ensure that the main valve also actually closes. This spacing is preferably smaller than a spacing of each of the inner switching positions from a respectively neighboring or closest outer switching position. It is thus possible to take account of idle travel at both ends of an adjustment path of the main valve.

In an advantageous embodiment, provision can be made that one switching position of the at least three switching positions defines an open position of the pilot valve. Thus, the valve is openable by actuation of the push-push mechanism. This switching position is preferably an outer switching position. This outer switching position thus delimits the adjustment path of the main valve on one side.

In an advantageous embodiment, provision can be made that one switching position of the at least three switching positions defines a closure position of the pilot valve. Thus, the main valve is closable by suitably frequent actuation of the push-push mechanism. This switching position is preferably an outer switching position. The adjustment path of the main valve can thus be limited at one end.

It is particularly expedient if the two outer switching positions are designed to limit the adjustment path on both sides.

In an advantageous embodiment, provision can be made that the valve tappet, in one switching position of the at least three switching positions, forms a stop for the movable diaphragm. The intermediate position is thus easy to define: when the diaphragm makes contact with the valve tappet, a pressure builds up in a pressure chamber acting on the diaphragm, which has the effect that the diaphragm detaches itself from the valve tappet and moves toward the valve seat. However, a relief opening closed by the valve tappet is then opened again, such that the pressure decreases. This has the effect that the diaphragm returns to the valve tappet, such that the described starting position is adopted again. This switching position is preferably an inner switching position. For example, an intermediate position is thus definable between the open position and the closure position.

In an advantageous embodiment, provision can be made that the push-push mechanism has a guide part with an arrangement of several preferably parallel guide tracks. This affords a simple possibility by which each guide track can be assigned one switching position. Preferably, the guide part is positionally fixed, i.e. fixed in relation to a housing. It is thus possible in particular to ensure that the guide part is arranged fixedly with respect to a valve seat, for example the aforementioned valve seat, of the main valve. A position of the valve tappet relative to the valve seat, which is likewise fixed directly or indirectly on the housing, is thus easily definable on the guide part for each switching position. Provision is preferably made that the switching position is in each case defined by a stop in the respective guide track. This represents a structurally simple way of configuring the switching positions. The individual stops are thus arranged at different locations or heights in relation to an adjustment path of the push-push mechanism.

The guide part is preferably designed to be exchangeable, for example as a separate component. This permits the formation of a series of valves with a uniform basic structure and with different guide parts.

A series of sanitary valves can thus be formed in which at least two variants in each case form a sanitary valve according to the invention, in particular as described above and/or as claimed in one of the claims directed to a sanitary part, wherein the sanitary valves have a uniform basic structure, in particular with main valve, pilot valve, displacement part and switching part, and differ in terms of different guide parts, in particular different positioning of stops on the guide tracks.

In an advantageous embodiment, provision can be made that the push-push mechanism has a displacement part with in each case one displacement element that runs in one or several of the guide tracks. For manual actuation, this displacement part can be coupled to or formed with an actuation element that is accessible from outside. The displacement part is preferably arranged to be movable, in particular relative to the described guide part. A switching operation can thus be triggered.

In an advantageous embodiment, provision can be made that the push-push mechanism has a switching part with at least one guide element which runs in at least one positionally fixed guide track, for example one of the aforementioned guide tracks, and which is able to be transferred from one guide track to a neighboring guide track. In particular, provision can be made here that a stop, for example the aforementioned stop, for the guide element, which in each case defines a switching position, is configured in each case in the guide tracks. Preferably, the switching part is arranged to be movable, in particular relative to the described guide part and/or the described displacement part. Here, the relative mobility with respect to the guide part means that the switching part can be moved with the displacement part in the guide part. The guide part preferably has several guide elements, for example guide projections, which can run in the individual guide tracks. Here, provision can be made that the aforementioned displacement elements each move a guide element along the guide track and press it out at an end of the respective guide track. During the switch-over, the relative mobility of switching part and guide part and a suitably short dimension of the guide tracks allow the guide elements to leave the guide track and transfer into the neighboring guide track. It is particularly expedient here if the switching part is arranged to be movable counter to a restoring force, for example in order to ensure touching contact between the switching part and the displacement part and/or to enforce a restoring movement. For example, with suitably configured bevels on the displacement part and between the guide tracks, the restoring force moreover permits an automatic alternation of the guide elements between the guide tracks in a desired direction, as soon as the guide elements leave their current guide track.

The guide tracks can here be designed as grooves, for example, in which the displacement elements and the guide elements engage.

In an advantageous embodiment, provision can be made that a valve seat which is closable by the diaphragm is arranged between at least one valve inlet and at least one valve outlet, wherein the diaphragm closes off a pressure chamber which is fillable from the at least one valve inlet, such that the diaphragm, with the pressure chamber filled, closes the valve seat in a closure position and, with the pressure chamber relaxed, releases the valve seat in an open position. Pressure-controlled switching of the main valve can thus be effected.

In an advantageous embodiment, provision can be made that a relief opening on the diaphragm that opens into the at least one valve outlet is closable by the valve tappet. This pressure control can thus be effected with the pilot valve.

In an advantageous embodiment, provision can be made that the valve tappet is formed on a control element that is inserted from the outside in a sealed manner into a pressure chamber, for example into the aforementioned pressure chamber. In this way, the pilot valve can be actuated from outside, for example mechanically.

In an advantageous embodiment, provision can be made that an equalizing device is formed in an operative connection between the pilot valve and the push-push mechanism, said equalizing device permitting actuation of the push-push mechanism when the pilot valve is closed. This permits a further movement of the push-push mechanism beyond an end position of the main valve as predefined by a valve seat, for example the aforementioned valve seat. On the one hand, it is thus possible to ensure that the main valve closes safely, and, on the other hand, that the push-push mechanism, uncoupled from the main valve, can execute a movement that is needed for leaving the closure position. Here, provision can be made that a coupling between the pilot valve and the push-push mechanism is produced via a restoring element. It is thus easily possible to produce a coupling outside of the case described. It is particularly expedient if the restoring element engages on the valve tappet. This permits a defined arrangement of the valve tappet relative to the push-push mechanism. This is particularly advantageous for the definition of the stated inner switching positions or intermediate positions.

To achieve the stated object, the features of the alternative embodiment of a sanitary valve are provided according to the invention. In particular, in a sanitary valve of the type described in the introduction, the stated object is thus achieved according to the invention by the fact that a flowrate regulator is arranged downstream from the main valve. It is advantageous here that a desired upper limit for a flowrate (relative to a unit of time) can be set independently of the flow properties at the main valve. The flowrate regulator sets this flowrate in a pressure-independent manner in a work range.

It is particularly expedient if this solution, of possibly independent inventive quality, is combined with the first solution described and discussed above. A valve can thus be formed which easily provides different switching positions, wherein an upper limit for the flowrate can be fixed, for example in order to meet legal requirements.

In an advantageous embodiment, provision can be made that the flowrate regulator is arranged in a tubular portion of the or a valve outlet of the main valve. In this way, the flowrate regulator can be easily used without the need for any great structural modifications. Provision can be made here that the flowrate regulator is inserted through a valve seat of the main valve as far as a stop in the tubular portion. It is thus possible to ensure, in design terms, that the flowrate regulator is difficult to remove once it has been installed. This can help to ensure compliance with legal or other requirements.

In an advantageous embodiment, provision can be made that a regulator core, in particular the aforementioned regulator core, which forms a regulating gap, has a basic shape that tapers in one direction. Adjustability of the upper limits of the flowrate, i.e. of the nominal flowrate, can thus be achieved in a manner known per se. For this purpose, the regulator core is preferably arranged centrally. In particular, provision can be made that the direction is oriented along an adjustment direction of the diaphragm. This permits a coupling of the adjustment of the diaphragm with the adjustment of the regulator core.

In an advantageous embodiment, provision can be made that a regulating profile is formed on the regulator core and, with an elastically deformable regulating element, defines a regulating gap having a pressure-dependent opening cross section. This represents an advantageous possibility, which is known per se for the definition of a nominal flow, of making the flowrate independent of pressure.

In an advantageous embodiment, provision can be made that a regulating element is formed as an O-ring. An easily available and manageable regulating element can thus be used. Provision can be made here that a regulator core, for example the aforementioned regulator core, engages through the regulating element. Thus, by adjusting the regulator core relative to the regulating element, for example when the regulator core has a tapering shape, it is possible to effect a change of the regulating gap in order to modify the nominal flowrate.

In an advantageous embodiment, provision can be made that a nominal flowrate of the flowrate regulator is modifiable by a push-push mechanism, in particular the aforementioned push-push mechanism. This permits simple adjustment between defined nominal flowrates.

In an advantageous embodiment, provision can be made that a regulator core, for example the above-described regulator core, of the flowrate regulator is arranged to be adjustable and is coupled to a push-push mechanism. The regulator core can thus adopt defined positions that correspond to predefined, discrete nominal flowrates. It is particularly expedient if the regulator core is coupled to the push-push mechanism which actuates the main valve and/or which engages on the pilot valve. The main valve and the flow regulator can thus be actuated jointly. It is particularly simple if the regulator core is displaceable.

In an advantageous embodiment, provision can be made that the regulator core is connected to the movable diaphragm. This represents a particularly simple way of coupling to the push-push mechanism.

In an advantageous embodiment, provision can be made that the regulating element is arranged in a seat, of which the radial closure is formed by a tubular portion, for example the aforementioned tubular portion, of a valve outlet, in particular the above-described valve outlet. A regulating element with the largest possible diameter can thus be used. It can generally be said that a regulating action of the regulating element can be better managed the larger the external dimensions of the regulating element. The embodiment dispenses with a radially outward closure of the seat by the flowrate regulator itself and thus makes additional space available for a larger regulating element. The radially outer closure of the seat can be formed here by the stated tubular portion.

BRIEF DESCRIPTION OF THE DRAWINGS

The invention is now described in more detail on the basis of illustrative embodiments, but it is not restricted to these illustrative embodiments. Further illustrative embodiments will emerge from combination of the features of individual or multiple claims with one another and/or with individual or multiple features of the illustrative embodiments.

In the figures:

FIG. 8 shows individual parts of the push-push mechanism from FIG. 7, FIG. 9 shows a developed view of the interior of the guide part from FIG. 8, with the position of the guide elements and displacement elements, FIGS. 10-13 show different switching positions for explaining the push-push mechanism according to FIG. 8, FIG. 14 shows the transition between two switching positions, FIG. 25 shows a design of a regulator core on a valve body, FIG. 26 shows an oblique axial section of the sanitary valve according to FIG. 1, and FIG. 27 shows an enlarged detail from FIG. 26.

DETAILED DESCRIPTION

Figure 1:
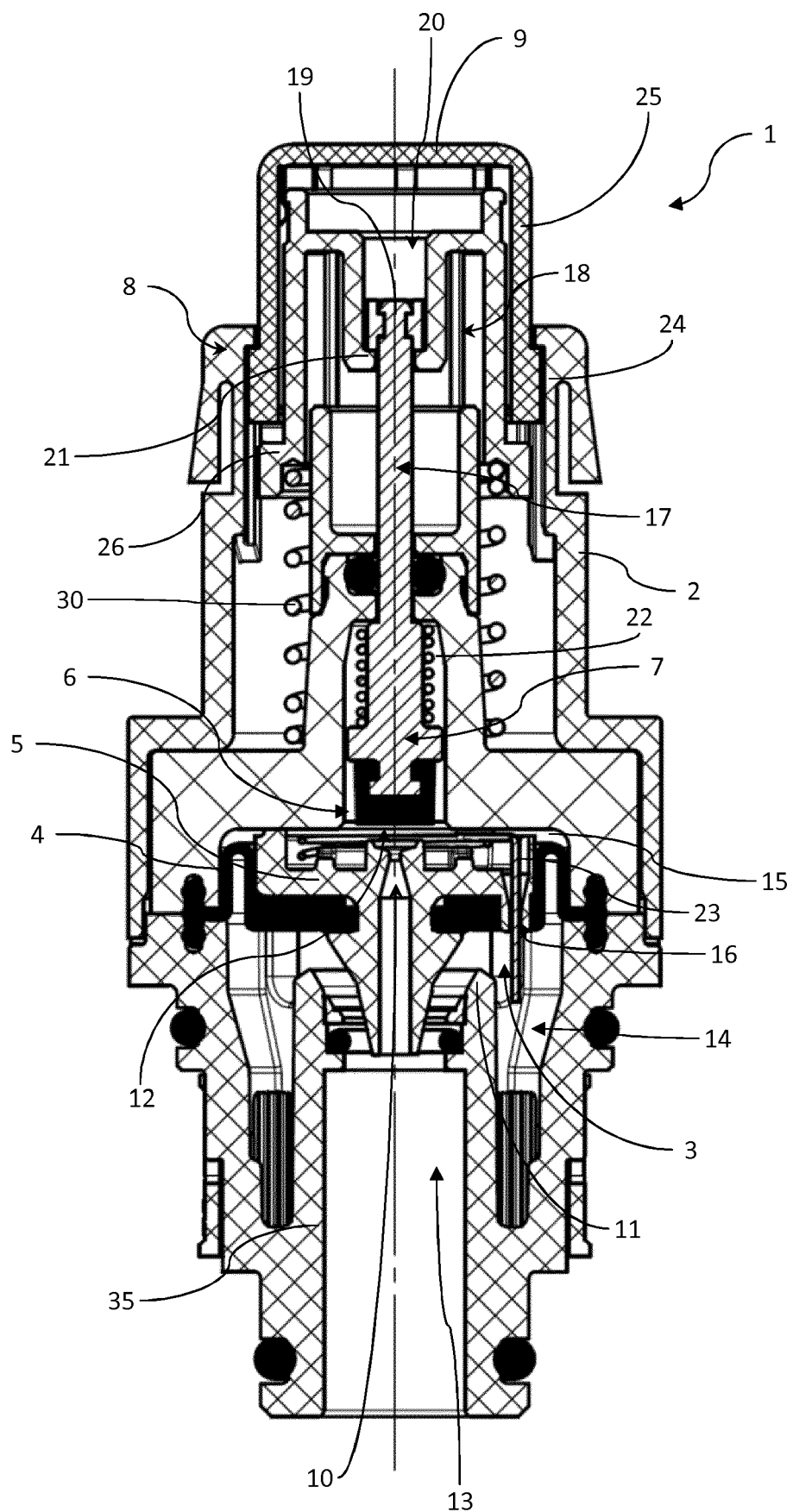
FIG. 1 shows an axial section through a sanitary valve according to the invention.

FIG. 1 shows a sanitary valve designated overall by reference sign 1 and having a main valve 3 in a housing 2.

The main valve 3 is equipped in a manner known per se with a movable diaphragm 4, which is made of an elastic material and carries a valve body 5 of the main valve 3.

The diaphragm 4 is actuatable by a pilot valve 6 in a manner likewise known per se. For this purpose, the pilot valve 6 has a longitudinally displaceable valve tappet 7 whose position along an adjustment path predefines the respective position of the valve body 5 and thus of the diaphragm 4.

The sanitary valve 1 moreover has a push-push mechanism 8. An actuation element 9 is formed externally on this push-push mechanism 8, by which actuation element 9 the push-push mechanism 8 is switchable between different switching positions by repeated pressing.

The valve tappet 7 is connected to the push-push mechanism 8 to produce an operative connection.

The push-push mechanism 8 has at least three switching states, between which the valve tappet 7 is switchable on account of the operative connection.

Figure 3:
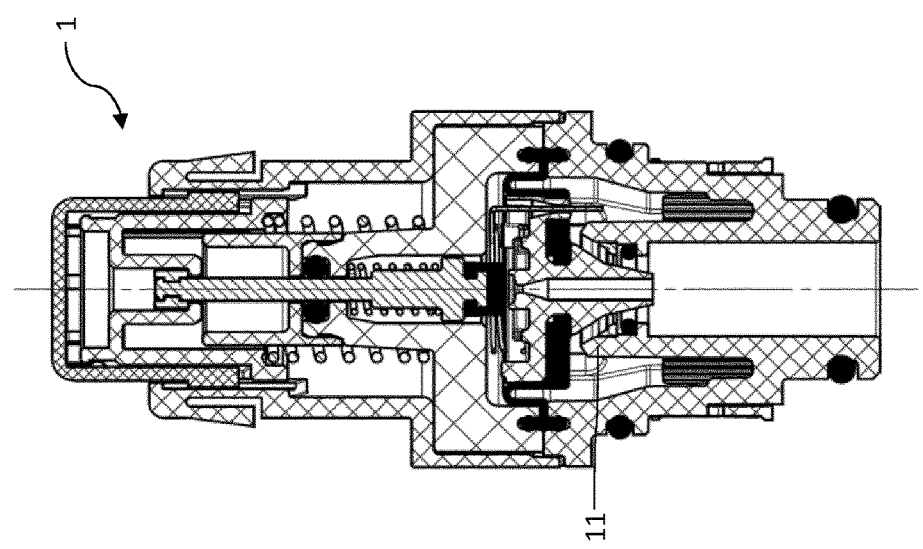
Figure 2:
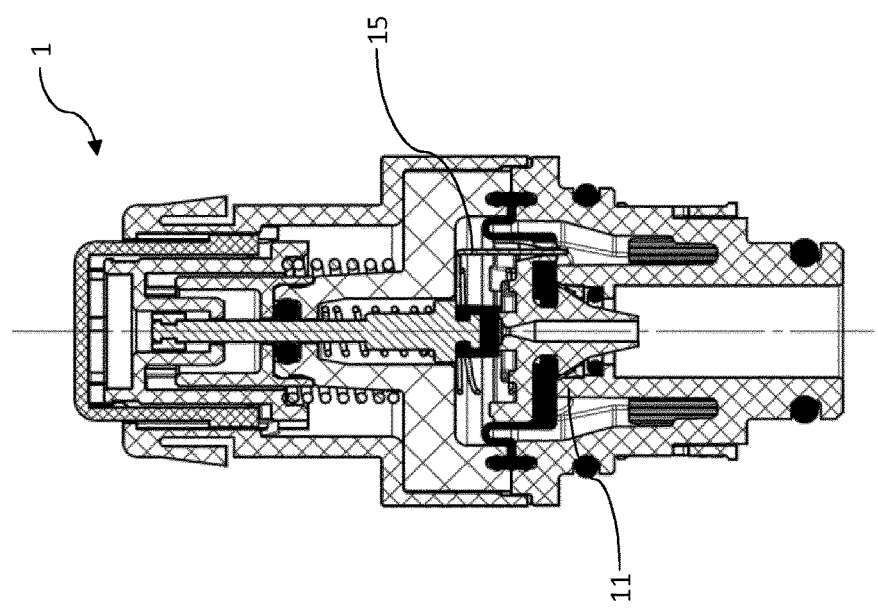

FIG. 2 shows a lower or outer switching position, in which the main valve 3 is closed and is thus in a closure position, FIG. 3 shows a central or inner switching position, in which the main valve 3 is more or less half opened and thus in an intermediate position, and an upper or further outer switching position, in which the main valve 3 is completely opened and thus in an open position.

The pilot valve 7 here has a relief opening 10, which is formed on the valve body 5 and thus on the movable diaphragm 4.

When the relief opening 4 is closed, a pressure builds up which presses the diaphragm 4 with the valve body 5 into a valve seat 11 of the main valve 3. The main valve 3 is then in its closure position.

When the relief opening 10 is opened, said pressure decreases, such that the diaphragm 4 withdraws with the valve body 5 from the valve seat 11. The main valve 3 is thus opened.

Figure 4:
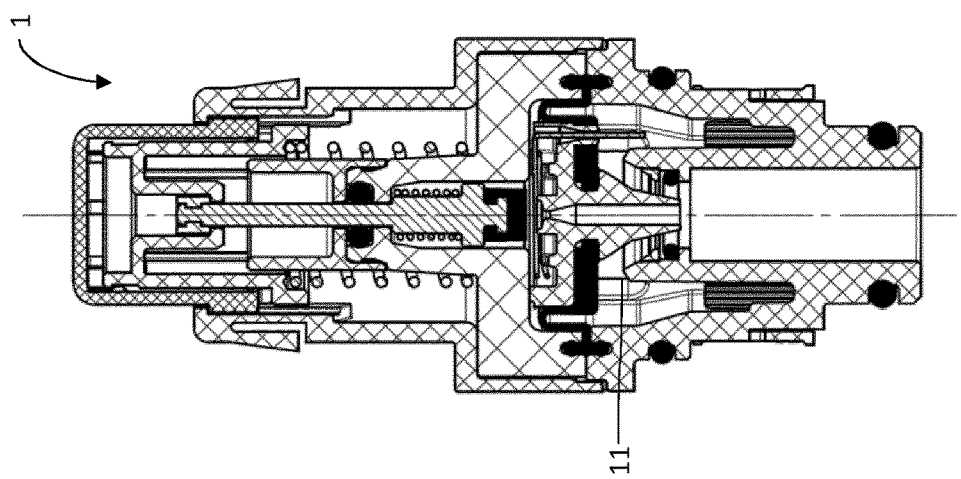
FIGS. 2-4 show different switching positions of the sanitary valve according to FIG. 1.

Accordingly, FIGS. 2 to 4 show different positions of the valve tappet 7, which each form one switching position of the at least three switching positions, as are predefined by the push-push mechanism 8.

FIG. 4 shows an outer switching position, which defines an open position of the pilot valve, and FIG. 2 shows a further outer switching position, which defines a closure position of the pilot valve 6. In FIG. 3, by contrast, the valve tappet 7 is in an intermediate position predefined by the push-push mechanism 8, which intermediate position represents an inner switching position on the adjustment path between the outer switching positions.

In this inner switching position, the valve tappet 7 forms a stop 12 for the movable diaphragm 4, which for this purpose engages on the valve body 5.

For the sake of completeness, the interaction of main valve 3 and pilot valve 6 is next explained in more detail.

As has already been mentioned, the main valve 3 has a valve seat 11, which is tightly closable by a valve body 5 and the diaphragm 4. The valve seat 11 is arranged between at least one valve inlet 14 and at least one valve outlet 13. The main valve 3 thus separates the at least one valve inlet 14 from the at least one valve outlet 13 and produces this.

The diaphragm closes off a pressure chamber 15, which is finable from the at least one valve inlet 14 via a filling opening 16. The filling opening 16 is always open.

This has the effect that, in a closure position, the diaphragm 4 (with the valve body 5 arranged on it) closes the valve seat 11, when the pressure chamber 15 is filled, and, in an open position, releases the valve seat 11 when the pressure in the pressure chamber 15 is reduced.

As has already been described, the relief opening 10 is closable and releasable by the valve tappet 7. Since the relief opening 10 merges into the at least one valve outlet 13, opening the relief opening 10 leads to the aforementioned pressure reduction in the pressure chamber 15 and therefore causes the main valve 3 to open. For this purpose, the relief opening 10 is dimensioned larger than the filling opening 16.

In the intermediate position, the diaphragm 4 will move toward the valve tappet 7, until the valve body 5 bears on the stop 12. A pressure buildup will then move the diaphragm 4 away from the stop, as a result of which the relief opening 10 is free again. A pressure decrease then follows, which again presses the diaphragm 4 against the stop 12. An equilibrium is thereby achieved in which the diaphragm 4 bears on the stop 12. The main valve 3 thus adopts an intermediate position between fully opened and fully closed.

The valve tappet 7 is coupled to the push-push mechanism 8 via a control element 17 in order to adopt the switching positions already described. The control element 17 is inserted sealingly into the pressure chamber 15 from the outside.

In the operative connection between the pilot valve 6 and the push-push mechanism 8, an equalizing device 18 is also formed which permits an actuation of the push-push mechanism 8 even if the pilot valve 6 is closed and cannot be moved any farther toward the valve seat 15.

For this purpose, the equalizing device 18 has an equalizing tappet 19, which is guided movably in a tappet seat 20, wherein the tappet seat 20 forms a unilateral tappet stop 21 for the equalizing tappet 19.

A restoring element 22, which applies the valve tappet 7 against the housing 2, presses the equalizing tappet 19 against the tappet stop 21, as long as this is possible in the respective switching position, in order to produce the coupling or operative connection between the pilot valve 6 and the push-push mechanism 8.

Figure 6:
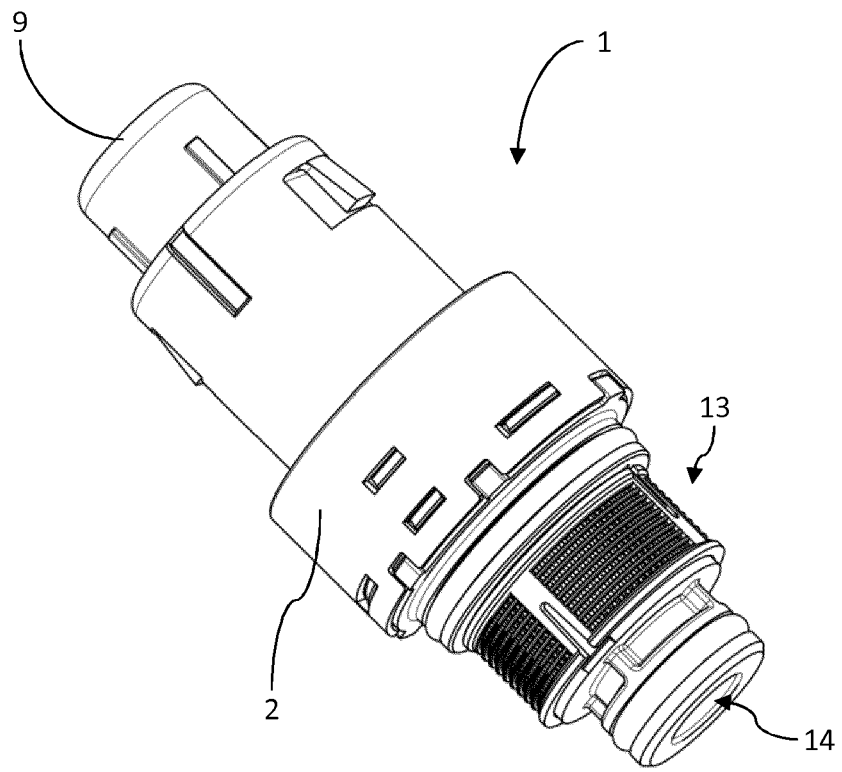
FIG. 6 shows a three-dimensional oblique view of the sanitary valve according to FIG. 1.

FIG. 6 shows a three-dimensional outer view of the described sanitary valve 1. The housing 2 is configured on the outside for insertion into a fitting (not shown).

Figure 7:
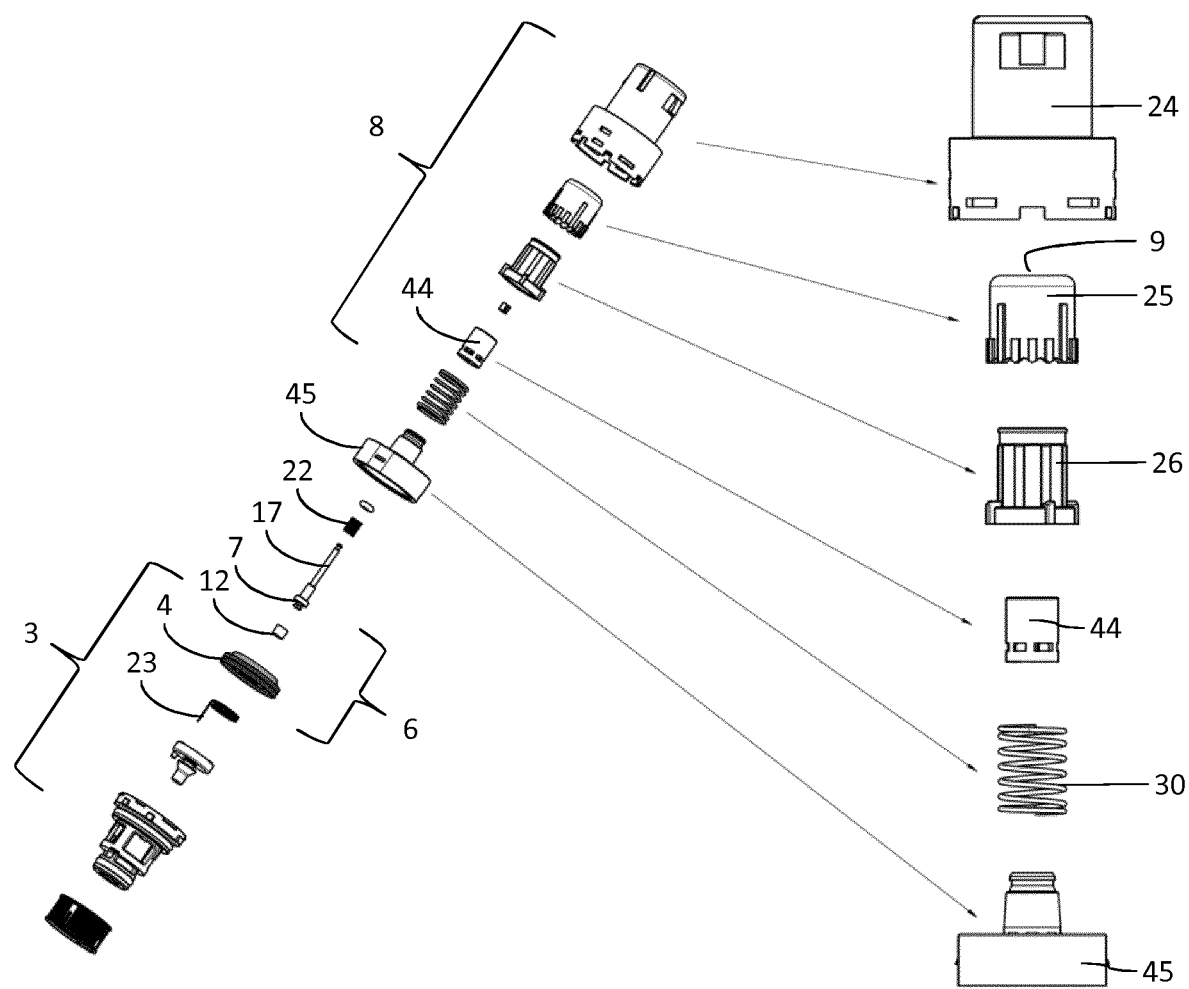
FIG. 7 shows individual parts of the sanitary valve according to FIG. 1, in particular of the push-push mechanism, in an exploded view.

FIGS. 7 and 8 show individual parts of the described sanitary valve 1 in order to explain the structure of the main valve 3, the pilot valve 6 and the push-push mechanism 8. The reference signs are chosen identically to those of FIGS. 1 to 5, and therefore the explanations concerning these figures also apply to FIGS. 7 and 8.

As part of the main valve 3, a cleaning element 23 can additionally be seen which is of an elastically resilient configuration and, with a pin-shaped free end, passes through the filling opening 6 and keeps it free. With its fixed end, the cleaning element 23 is secured on the housing 2.

The push-push mechanism 8 has a guide part 24 which is arranged fixedly on the housing 2 or relative thereto.

The displacement part 25 and the switching part 26 extend in this sleeve-shaped guide part 24, wherein the actuation element 9 is formed on the outside of the displacement part 25.

Axially extending guide tracks 27, which are here groove-shaped, are formed internally on the guide part 24. Displacement elements 28 of the displacement part 25 and guide elements 29 of the switching part 26 engage in these guide tracks 27.

The guide elements 29, designed here as projections, are arranged under the displacement elements 28 which are likewise designed as projections. Thus, a restoring spring 30, which applies a restoring force to the switching part 26, also guides the displacement part 25 to its respectively uppermost position. The restoring spring 30 is here guided on a spring-guiding sleeve 44 and is supported on the housing 2 via a spring abutment 45.

Accordingly, the push-push mechanism 8 has a positionally fixed guide part 24 with an arrangement of several parallel guide tracks 27. Each guide track 27 is assigned a switching position, which is defined by a stop 31 in the respective guide track 27.

Thus, the push-push mechanism 8 moreover has a displacement part 25 which is movable relative to the housing 2 and to the guide part 24. Displacement elements 28, formed on the displacement part 25, protrude radially outward as projections and each engage in one of the radially inwardly open guide tracks 27. Thus, a displacement element 28 is arranged in each guide track 27. These displacement elements 28 always remain in their respective guide track 27.

The push-push mechanism 8 thus finally has the switching part 26, arranged movably relative to the housing 2 with the guide part 24 and to the displacement part 25. It has four radially outwardly protruding guide elements 29, which each engage in a respective guide track 27. With the respective displacement element 28, these guide elements 29 can be pushed out of the guide track 27 via the axially open end thereof.

By use of the restoring spring 30 and corresponding bevels on the displacement part 25 and the guide part 24, the switching part 26 is then transferred to the next, neighboring guide track 27.

The aforementioned stop 31 for the guide element 29 is formed in the guide tracks 27 and in each case defines a switching position.

FIG. 9 is a developed view showing the relative position of the guide tracks 27 with their respective stops 31, the displacement elements 28 and the guide elements 29 in a depiction similar to an exploded view.

It will be seen that two outer switching positions and two inner switching positions are defined by the arrangement of the stops 31, as is explained below.

FIGS. 10 to 14 show different states of engagement of the parts from FIG. 8.

FIG. 10 shows the lowermost position of the guide elements 29, such that a closure position as in FIG. 2 is defined.

FIG. 11, by contrast, shows an uppermost position of the guide elements 29, such that an open position as in FIG. 4 is defined.

FIGS. 12 and 13, by contrast, show intermediate positions. In contrast to FIGS. 2 to 4, two intermediate positions are now defined that belong to two inner switching positions. Each of these switching positions corresponds approximately to the view according to FIG. 3.

Figure 16:
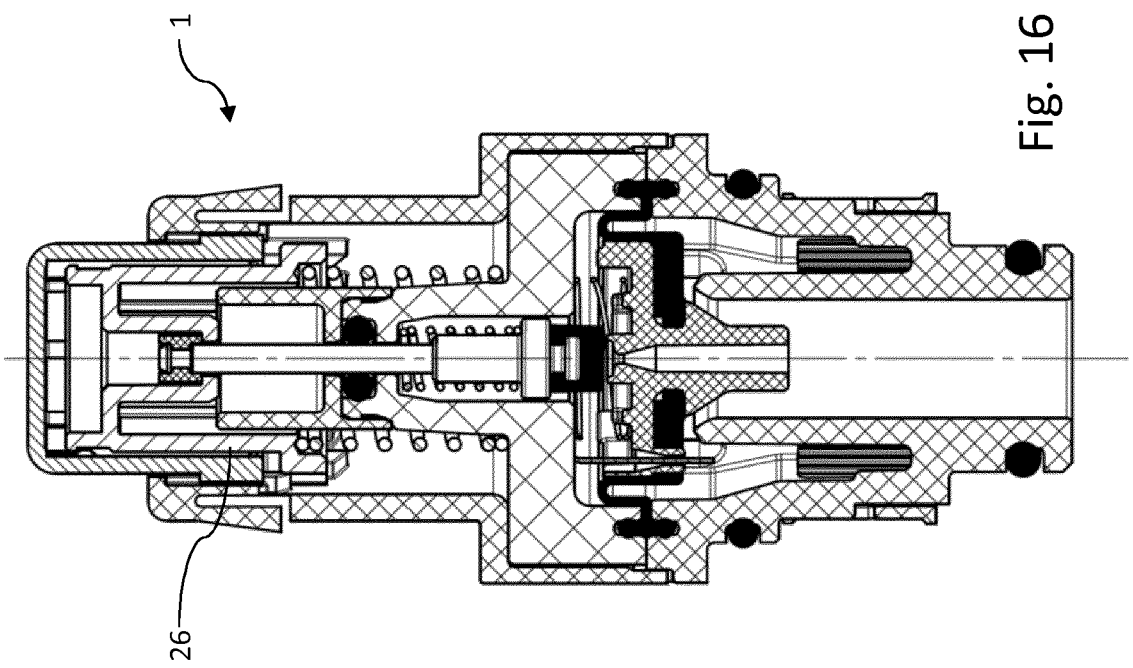
FIGS. 15-18 show the switching positions associated with FIGS. 10-13.
Figure 15:
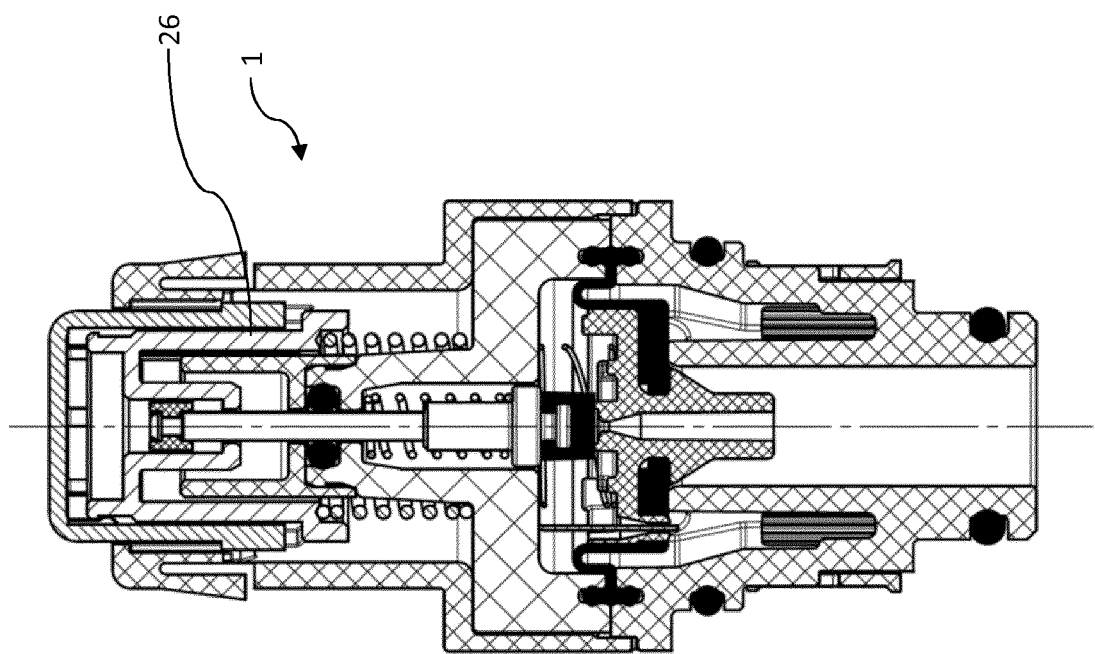
Figure 18:
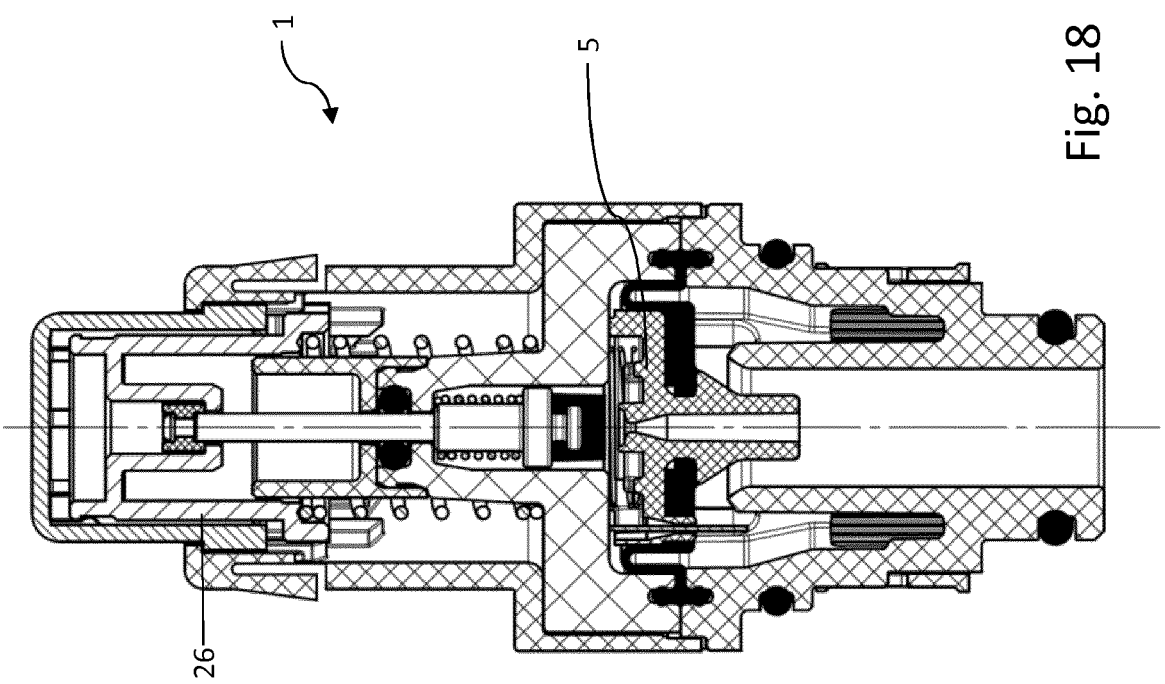
Figure 17:
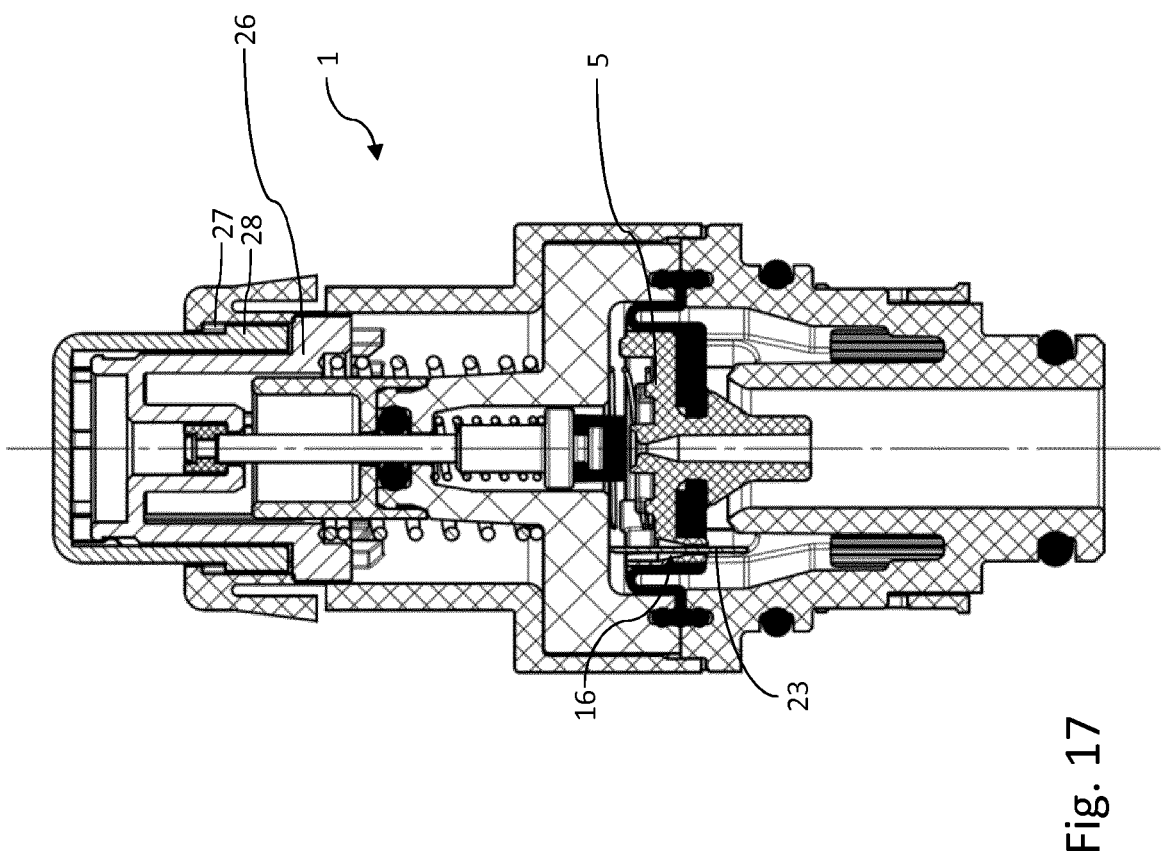

FIGS. 15 to 18 show these four switching positions, wherein FIG. 15 shows the switching position according to FIG. 10, FIG. 16 shows the switching position according to FIG. 12, FIG. 17 shows the switching position according to FIG. 13, and FIG. 18 shows the switching position according to FIG. 11.

Thus, the push-push mechanism 8 realizes two outer switching positions according to FIGS. 15 and 18 and two inner switching positions according to FIGS. 16 and 17. It will be seen from FIGS. 10 to 13 that the two inner switching positions lie between the two outer switching positions, wherein a spacing 32 between the two inner switching positions is smaller than a spacing 33 of each of the inner switching positions from a respectively neighboring or closest outer switching position.

Figure 5:
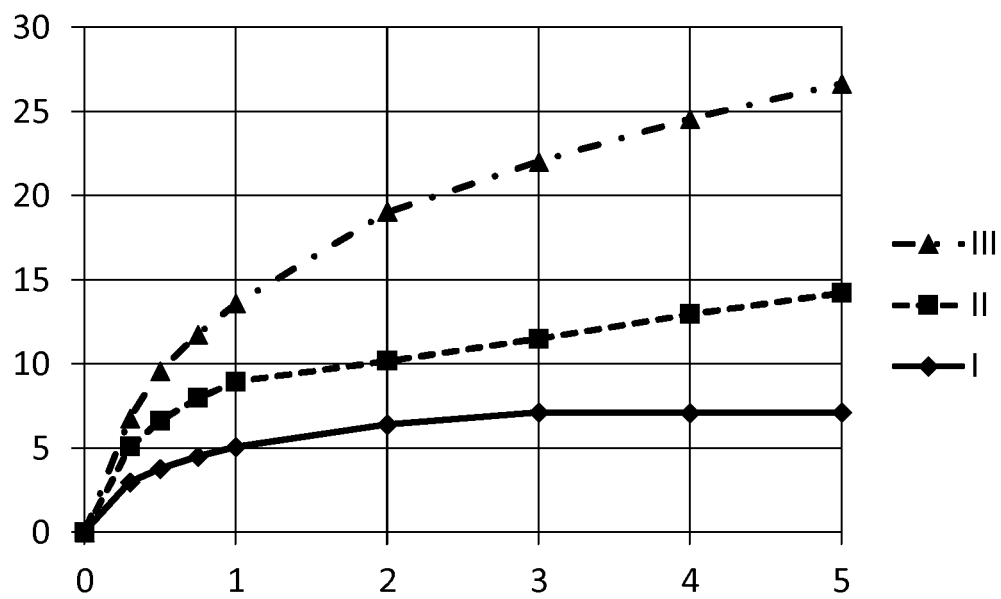
FIG. 5 shows flow curves at switching positions of a sanitary valve according to the invention.

FIG. 5 shows different flow curves (flowrate via the pressure difference between the valve inlet 14 and the valve outlet 13 of the sanitary valve 1) for the switching positions according to FIGS. 15 to 18.

It can be stated that the switching position according to FIG. 16 belongs to the curve I, the switching position according to FIG. 17 belongs to the curve II, and the switching position according to FIG. 18 belongs to the curve III from FIG. 5. The switching position according to FIG. 15 has the flowrate zero. The larger spacings 33 are necessary in order to take into account the idle travel in the push-push mechanism 8 and in the pilot valve 6, and therefore the approximately uniform distribution of the curves I-III in FIG. 5 is obtained.

Figure 19:
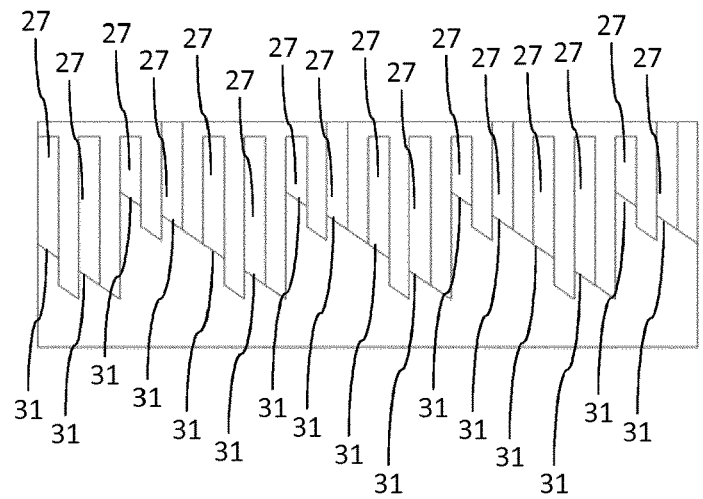
FIG. 19 shows an alternative to FIG. 8.

FIG. 19 shows a possible arrangement of the stops 31 in the guide tracks 27, which arrangement gives only three switching positions, for example according to FIGS. 2 to 4.

Otherwise, the guide part 24 is unchanged in relation to the previous drawings, and therefore a series of sanitary valves 1 with different switching behavior and/or flow behavior can be formed by simply exchanging the guide part 24.

Figure 20:
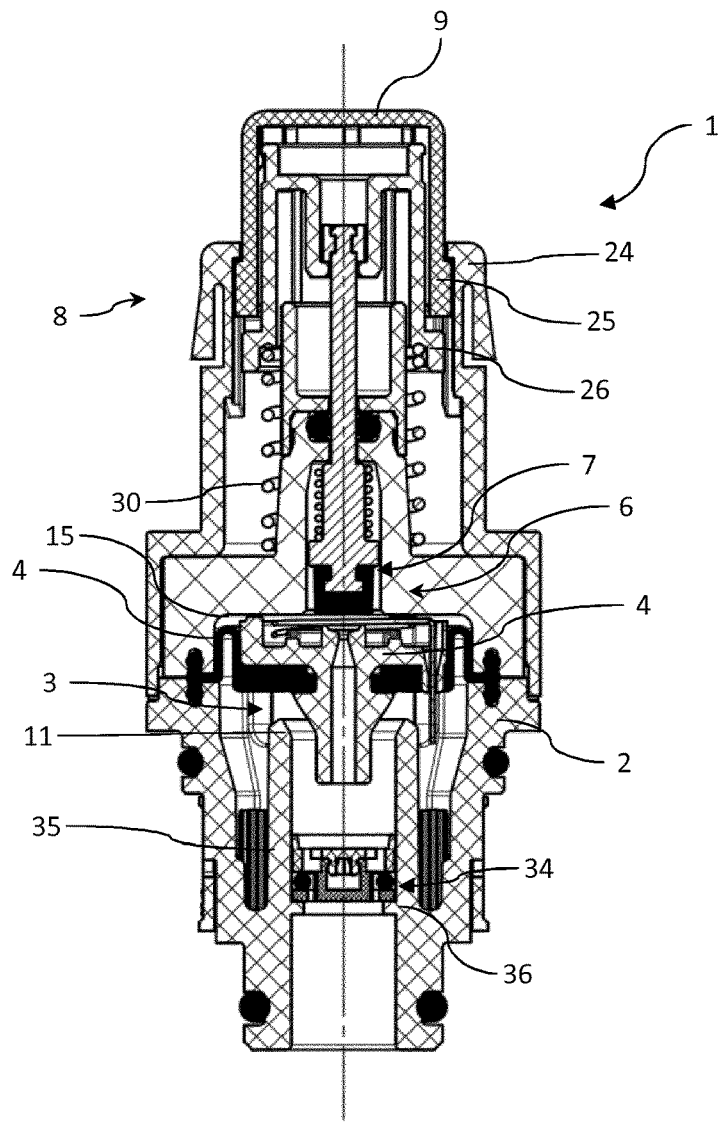
FIG. 20 shows a further sanitary valve according to the invention in axial section.
Figure 21:
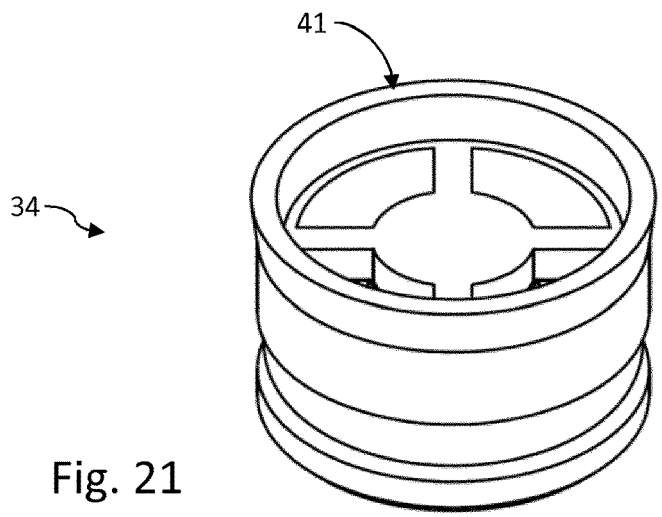
FIG. 21 shows a three-dimensional oblique view of the inflow side of the flowrate regulator from FIG. 20.
Figure 22:
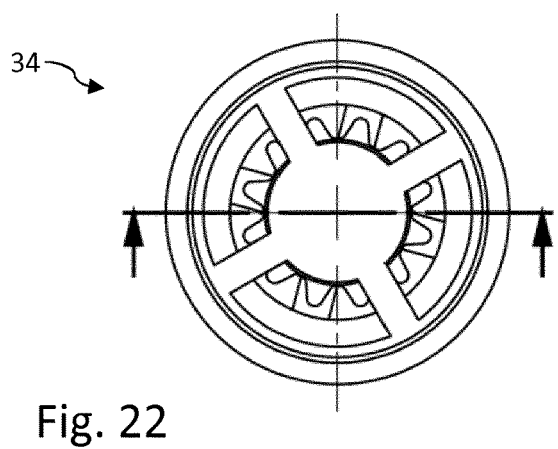
FIG. 22 shows a plan view of the inflow side from FIG. 21.
Figure 23:
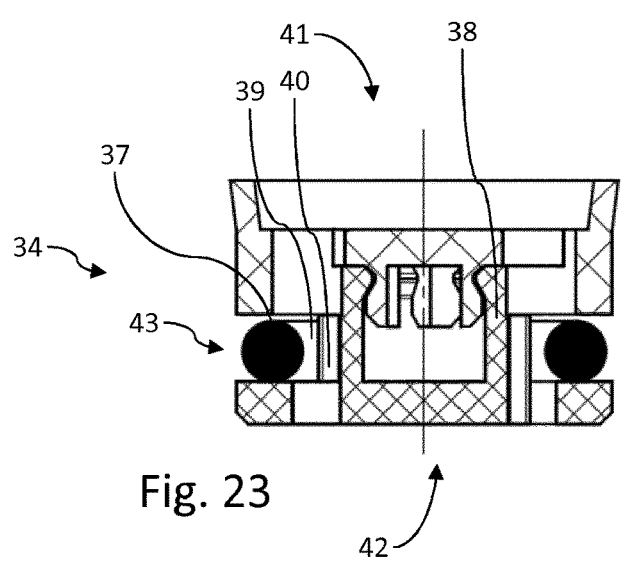
FIG. 23 shows an axial sectional view along the section in FIG. 22.
Figure 24:
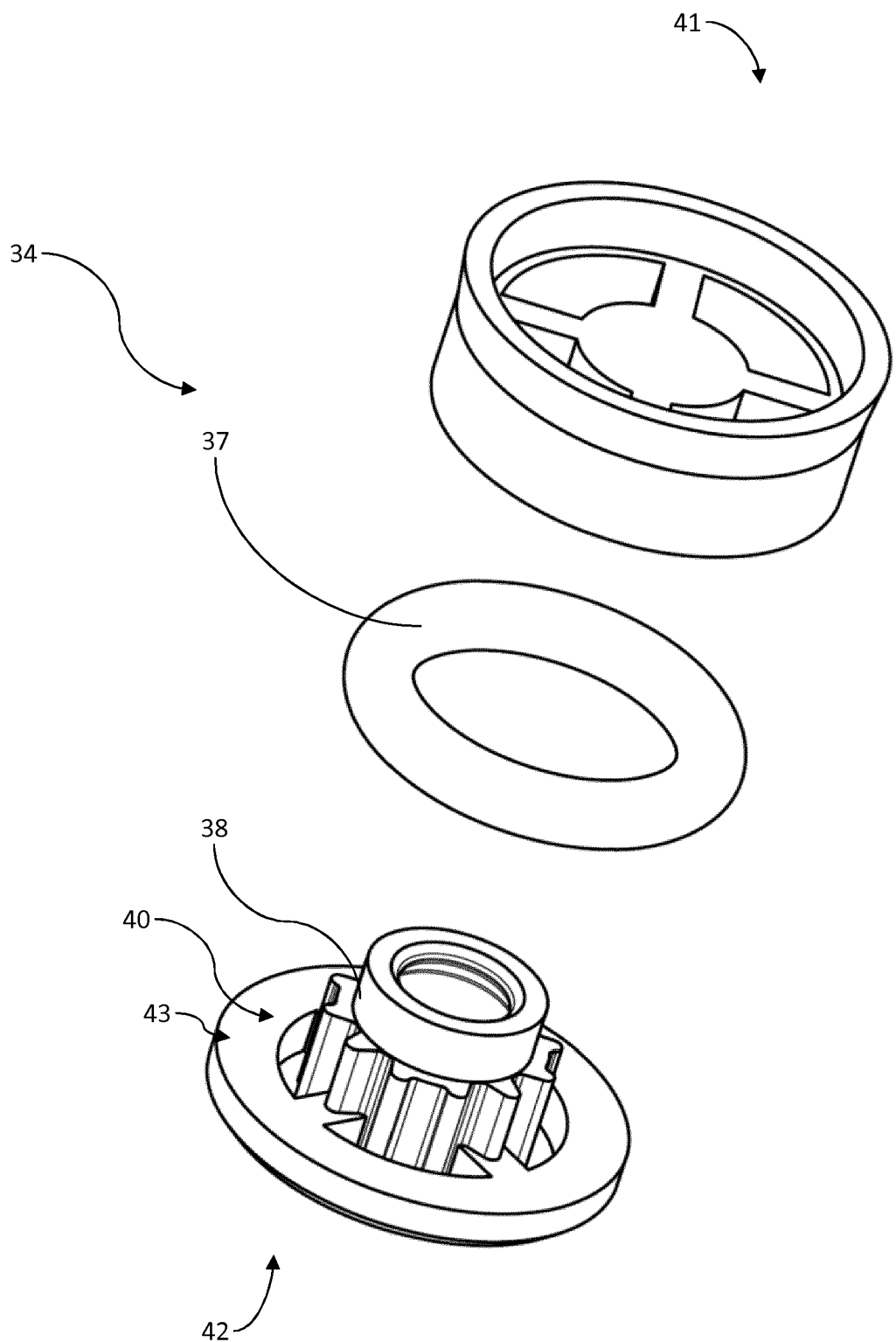
FIG. 24 shows an exploded view of FIG. 21.

FIG. 20 shows a further sanitary valve 1 according to the invention. The same reference signs as in FIGS. 1 to 19 have been chosen for explanatory purposes, such that the explanations concerning FIGS. 1 to 19 also apply to FIG. 20.

A flowrate regulator 34 is additionally arranged downstream from the main valve 3.

The flowrate regulator 34 is here arranged in a tubular portion 35 of the valve outlet 13 of the main valve 3. It will be seen from FIG. 20 that the flowrate regulator 34 is inserted through the valve seat 11 of the main valve 3 into the tubular portion 35 as far as a stop 36.

The flowrate regulator 34 sets a predefined nominal flowrate independently of pressure within a work range.

For the purposes of the invention, a flowrate regulator 34 can be generally characterized in that, for example, a regulating element 37 which is deformable by water pressure defines, with a regulator core 38, a regulating gap 39 whose opening cross section, due to the deformability of the regulating element (often an O-ring or a disk made of an elastic material), is pressure-dependent. A small opening cross section is obtained in the case of high pressures or pressure differences at the valve seat 11, and a large cross section is obtained in the case of low pressures or pressure differences, such that a constant flow with a nominal flowrate is achieved in the working range.

Here, the regulating gap 39 is formed, for example, radially to the inside of the regulating element 37. However, a regulating gap 39 can also or additionally be formed radially outside the regulating element 37. The tapering basic shape of the regulator core 38 can thus be formed as a positive outer contour (as shown) and/or as a negative inner contour (not shown).

In the illustrative embodiment, the regulator core 38 is formed with a tapering basic shape along an adjustment direction of the diaphragm 4.

A regulating profile 40 is formed on the regulator core 38 and, with the elastically deformable regulating element 37, forms the regulating gap 39 with a pressure-dependent opening cross section.

Here, the regulator core 38 engages through the ring-shaped regulating element 37.

The nominal flowrate of the flowrate regulator 34 is modifiable using the push-push mechanism 8, as is described in detail below.

For this purpose, the regulator core 38 of the flowrate regulator 34 is arranged displaceably relative to the regulating element 37. Since the regulator core 38 has a tapering basic shape, a modifiable opening cross section of the regulating gap 29 is thus obtained in the pressure-free state.

As is shown in FIGS. 25 to 27, the regulator core 38 is here formed on the valve body 5 and is thus connected to the diaphragm 4.

The regulator core 38 is thus coupled to the push-push mechanism 8. A depth of insertion of the regulator core 38 in the flowrate regulator 34 thus belongs to each switching position.

The flowrate regulator 34 is shown individually in FIGS. 21 to 24.

It will be noted that the regulating element 37 is arranged between an inflow side 41 and an outflow side 42 in a seat 43. This seat 43 is radially open, such that the regulating element 37 is arranged in a seat 43 whose radial closure is formed by the tubular portion 35 of the valve outlet 13.

FIGS. 25 to 27 show further individual views of the sanitary valve according to FIGS. 1 to 6.

Accordingly, this sanitary valve 1 also has a flowrate regulator 34. However, unlike in FIGS. 21 to 24, it is not designed as an insertable unit and is instead integrally formed in the tubular portion 35, wherein the regulating element 37 is axially secured by a retainer ring 46 on the inflow side.

It will be seen from FIG. 25 that the regulator core 38 is integrally formed on the valve body 5 at the outflow side.

Here, the diaphragm 4 is arranged between the regulator core 38 and the valve body 5, wherein a hole is formed in the diaphragm 4, through which hole there engages a connection piece 47, which connects the regulator core 38 to the valve body 5 in one piece.

The regulator core 38 is thus adjustable together with the valve body 5.

In this way, a coupling is obtained which has the effect that the nominal flowrate, set by the flowrate regulator 34, is adjustable in discrete steps by the push-push mechanism 8.

In the sanitary valve 1, it is thus provided to actuate a movable diaphragm 4 of a main valve 3 using a push-push mechanism 8 which defines at least three discrete switching positions of the main valve 3 controlled via a pilot valve 6, and/or to arrange a flowrate regulator 34, preferably adjustable by the push-push mechanism 8, permanently downstream from the main valve 3.

LIST OF REFERENCE SIGNS

1 sanitary valve
2 housing
3 main valve
4 diaphragm
5 valve body
6 pilot valve
7 valve tappet
8 push-push mechanism
9 actuation element
10 relief opening
11 valve seat
12 stop
13 valve outlet
14 valve inlet
15 pressure chamber
16 filling opening
17 control element
18 equalizing device
19 equalizing tappet
20 tappet seat
21 tappet stop
22 restoring element
23 cleaning element
24 guide part
25 displacement part
26 switching part
27 guide track
28 displacement element
29 guide element
30 restoring spring
31 stop
32 spacing
33 spacing
34 flowrate regulator
35 tubular portion
36 stop
37 regulating element
38 regulator core
39 regulating gap
40 regulating profile
41 inflow side
42 outflow side
43 seat
44 spring-guiding sleeve
45 spring abutment
46 retainer ring
47 connection piece

The invention claimed is:
1. A sanitary valve, comprising:
   a main valve (3) which has a movable diaphragm (4),
   a pilot valve (6) configured to actuate the main valve (3), the pilot valve including a valve tappet (7) configured to predefine a position of the diaphragm (4),
   a push-push mechanism (8) connected to the valve tappet (7), the push-push mechanism is configured to switch the valve tappet (7) between at least three switching positions, and
   the valve tappet (7), in an inner switching position of the at least three switching positions, defines a stop for the movable diaphragm (4).

2. The sanitary valve as claimed in claim 1, wherein the push-push mechanism (8) defines two outer switching positions and at least two inner switching positions, the at least two inner switching positions lie between the two outer switching positions, and a spacing between the two inner switching positions is smaller than a spacing of at least one of the inner switching positions from a respectively neighboring or closest one of the outer switching positions.

3. The sanitary valve as claimed in claim 1, wherein one said switching position of the at least three switching positions defines an open position of the pilot valve (6), and one other said switching position of the at least three switching positions defines a closure position of the pilot valve (6).

4. The sanitary valve as claimed in claim 1, wherein the push-push mechanism (8) comprises a positionally fixed guide part (24) with an arrangement of a plurality of guide tracks (27), and at least some of the guide tracks (27) are assigned respective ones of the switching positions by a stop (31) in the respective one of the guide tracks (27).

5. The sanitary valve as claimed in claim 4, wherein the push-push mechanism (8) has a movable displacement part (25) with in each case one displacement element (28) that runs in at least one of the guide tracks (27).

6. The sanitary valve as claimed in claim 5, wherein the push-push mechanism (8) has a switching part (26) which is arranged movably counter to a restoring force and which has at least one guide element (29) which runs in at least one of the fixed guide tracks (27) and which is transferrable from one guide said track (27) to a neighboring one of the guide tracks (27), and the stop (31) for the guide element (29), which in each case defines one said switching position, is configured in each case in the guide tracks (27).

7. A series of sanitary valves, each said sanitary valve (1) being as claimed in claim 6, the sanitary valves (1) have a uniform basic structure and include different ones of the guide parts (24) having different positioning of the stops on the guide tracks (27).

8. The sanitary valve as claimed in claim 1, further comprising a valve seat (11) which is closable by the diaphragm (4) arranged between at least one valve inlet (13) and at least one valve outlet (13), the diaphragm (4) being configured to close off a pressure chamber (15) which is fillable from the at least one valve inlet (14), such that the diaphragm (4), with the pressure chamber (15) filled, closes the valve seat (11) in a closure position and, with the pressure chamber (15) relaxed, releases the valve seat (11) in an open position.

9. The sanitary valve as claimed in claim 8, further comprising a relief opening (10) on the diaphragm (4) that opens into the at least one valve outlet (14) and is closable by the valve tappet (7).

10. The sanitary valve as claimed in claim 8, wherein the valve tappet (7) is formed on a control element (17) that is inserted from outside in a sealed manner into the or a pressure chamber (15).

11. The sanitary valve as claimed in claim 1, further comprising an equalizing device (18) formed in an operative connection between the pilot valve (6) and the push-push mechanism (8), said equalizing device (18) permitting actuation of the push-push mechanism (8) when the pilot valve (6) is closed.

12. A sanitary valve, comprising:
   a main valve (3) which has a movable diaphragm (4),
   a pilot valve (6) configured to actuate the main valve (3), the pilot valve including a valve tappet (7) configured to predefine a position of the diaphragm (4), and
   a flowrate regulator (34) arranged downstream from the main valve (3), the flowrate regulator including a regulator core (38) that is arranged to be adjustable connected to the movable diaphragm (4).

13. The sanitary valve as claimed in claim 12, wherein the flowrate regulator (34) is arranged in a tubular portion (35) of a valve outlet (14) of the main valve (3).

14. The sanitary valve as claimed claim 13, further comprising a regulator core (38), which forms a regulating gap (39), and has a basic shape that tapers in one direction.

15. The sanitary valve as claimed in claim 14, further comprising a regulating profile (40) formed on the regulator core (38) that, with an elastically deformable regulating element (37), defines a regulating gap (39) having a pressure-dependent opening cross section.

16. The sanitary valve as claimed in claim 15, wherein the regulating element (37) is formed as an O-ring, and the regulator core (38) engages through the regulating element (37).

17. The sanitary valve as claimed in claim 15, wherein the regulating element (37) is arranged in a seat, of which a radial closure is formed by the tubular portion of the valve outlet (14).

18. The sanitary valve as claimed in claim 12, further comprising a push-push mechanism (8) by which a nominal flowrate of the flowrate regulator (34) is modifiable.

* * * * *